J. A. HEALD.
Combined Fork, Shovel, and Hoe.
No. 81,166.
Patented Aug. 18, 1868.
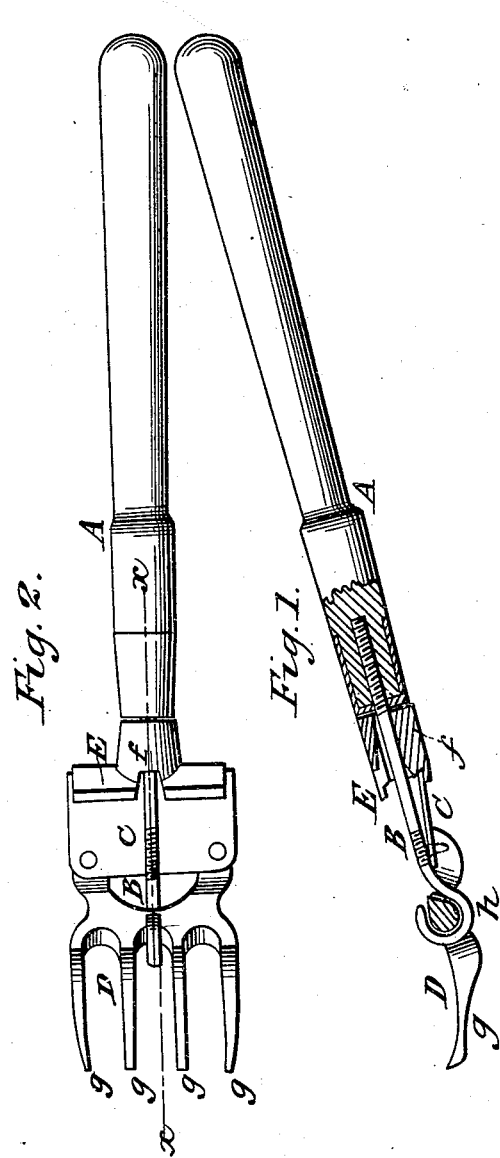

United States Patent Office.

J. A. HEALD, OF COLUMBUS, MISSISSIPPI.

Letters Patent No. 81,166, dated August 18, 1868.

IMPROVEMENT IN COMBINED FORK, SHOVEL, AND HOE.

The Schedule referred to in these Letters Patent and making part of the same.

TO ALL WHOM IT MAY CONCERN:

Be it known that I, J. A. HEALD, of Columbus, in the county of Lowndes, and State of Mississippi, have invented a new and improved Convertible Agricultural Implement; and I do hereby declare that the following is a full, clear, and exact description thereof, which will enable those skilled in the art to make and use the same, reference being had to the accompanying drawings, forming part of this specification.

This invention relates to a new and improved device whereby various implements are formed by different combinations of the parts.

And the invention consists in adapting the parts to such combinations as will be hereinafter described.

Figure 1 represents the implement as a forked or pronged spade, it being a side view of the same.

Figure 2 is a longitudinal section of fig. 1, through the line $x\,x$.

Similar letters of reference indicate corresponding parts.

A is the handle, which is tubular at its lower end, and is provided with a screw-nut.

B is the shank or hook, which screws into the handle, as seen.

C is a blade, which is permanently attached to the fork D.

E is a washer, which is loose on the shank B, with the collar $f$ of which the handle comes in contact when it is screwed up.

As seen in the drawing, the blade C is in contact with the face of the washer, and we have a forked or pronged spade.

By severing it, or bringing the ends of the teeth $g$ against the face of the washer, a regular spade is formed.

The hook $h$ of the shank engages with the base of the fork in each combination, as seen in the drawing.

It will be seen that the screw-thread on the end of the shank is used in these combinations.

For making a hoe and a rake of the parts C and D, these parts are turned, so as to stand at a right angle, or nearly so, with the handle.

The shank slips into the tubular handle, and the screw-thread, near the hook $h$, engages with the nut in the handle, while the washer E is brought in contact with the base of the fork.

By this method of fastening, almost any implement may be attached to the handle, thereby adapting the implement to every variety of crop and method of cultivation.

I claim as new, and desire to secure by Letters Patent—

The tubular handle A, the hook-shank B, and the washer E, when the same are constructed, arranged, and combined, substantially as shown and described for the purposes set forth.

The above specification of my invention signed by me, this     day of     , 1868.

J. A. HEALD.

Witnesses:
    Jos. H. STEVENS,
    J. M. WAKEFIELD.